(12) United States Patent
Kaburagi et al.

(10) Patent No.: US 8,538,265 B2
(45) Date of Patent: Sep. 17, 2013

(54) OPTICAL COMMUNICATION DEVICE AND DISPERSION COMPENSATION METHOD

(75) Inventors: Kenichi Kaburagi, Kawasaki (JP); Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 13/200,651

(22) Filed: Sep. 28, 2011

(65) Prior Publication Data

US 2012/0020661 A1 Jan. 26, 2012

Related U.S. Application Data

(63) Continuation of application No. PCT/JP2009/056583, filed on Mar. 30, 2009.

(51) Int. Cl.
*H04J 14/02* (2006.01)

(52) U.S. Cl.
USPC .............................. 398/81; 398/147; 398/148

(58) Field of Classification Search
USPC .......................... 398/81, 147–148, 155–159
See application file for complete search history.

(56) References Cited

U.S. PATENT DOCUMENTS

| 7,450,856 | B2 | 11/2008 | Yoshimoto et al. | |
| 2003/0152322 | A1* | 8/2003 | Smith et al. | 385/27 |
| 2003/0163771 | A1* | 8/2003 | Tomofuji | 714/48 |
| 2004/0114936 | A1 | 6/2004 | Sugihara et al. | |
| 2004/0213578 | A1* | 10/2004 | Takahara et al. | 398/147 |
| 2005/0213986 | A1* | 9/2005 | Yoshimoto et al. | 398/147 |
| 2009/0238563 | A1* | 9/2009 | Fukashiro et al. | 398/30 |

FOREIGN PATENT DOCUMENTS

| JP | 2000-115077 | 4/2000 |
| JP | 2003-224523 | 8/2003 |
| JP | 2004-128974 | 4/2004 |
| JP | 2005-286382 | 10/2005 |
| WO | 99/48231 A1 | 9/1999 |

OTHER PUBLICATIONS

Japanese Office Action issued Aug. 21, 2012 in corresponding Japanese Patent Application No. 2011-508119.
International Search Report of PCT/JP2009/056583 mailed Jul. 7, 2009.

* cited by examiner

*Primary Examiner* — Dzung Tran
(74) *Attorney, Agent, or Firm* — Staas & Halsey

(57) ABSTRACT

An optical communication device comprises a variable dispersion compensator, a photoelectric converter, and a processor. The variable dispersion compensator compensates an amount of wavelength dispersion of an optical signal received from an optical transmission line. The photoelectric converter converts the compensated optical signal into an electrical signal. The processor is operative to extract a frequency of the converted electrical signal, and to discriminate bit information of the electrical signal based on the frequency extracted using a decision phase and a decision threshold. The processor is operative to detect bit error information that is information related to an error of the discriminated bit information, and to control the amount of wavelength dispersion based on the detected bit error information.

20 Claims, 14 Drawing Sheets

WAVELENGTH DISPERSION=
0 ps/nm

WAVELENGTH DISPERSION=
-120 ps/nm

WAVELENGTH DISPERSION=
+120 ps/nm

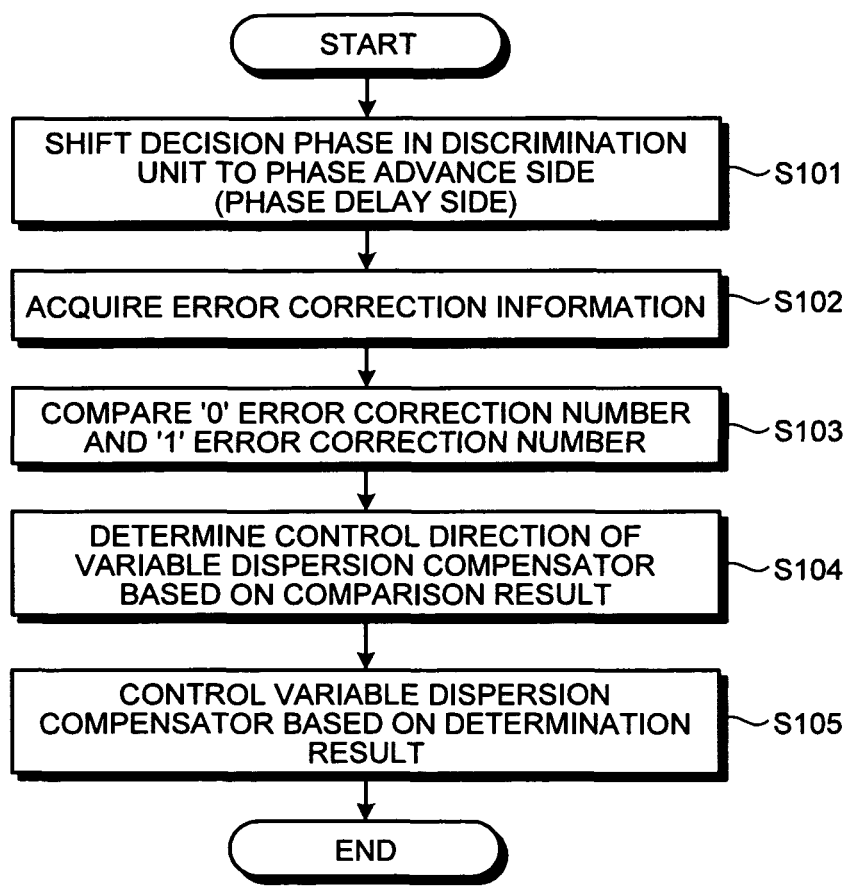

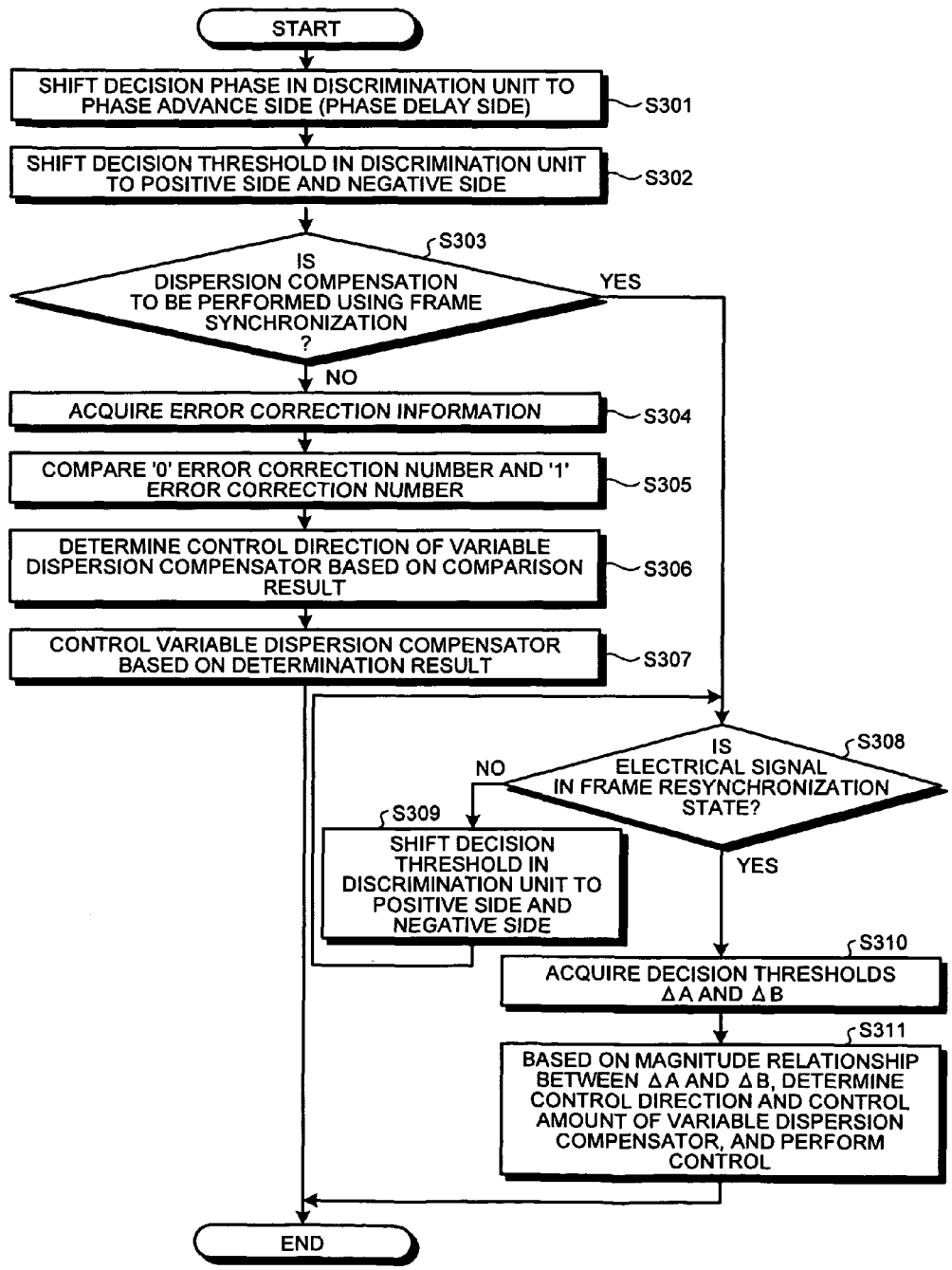

OPTICAL COMMUNICATION DEVICE AND DISPERSION COMPENSATION METHOD

CROSS-REFERENCE TO RELATED APPLICATION

This application is a continuation of International Application No. PCT/JP2009/056583, filed on Mar. 30, 2009, the entire contents of which are incorporated herein by reference.

FIELD

The embodiments discussed herein are directed to an optical communication device that performs dispersion compensation of an optical signal in an optical communication system and to a dispersion compensation method.

BACKGROUND

Conventionally, an optical modulation technology that is the mainstream in optical communication systems these days has been on-off key (OOK, that is, binary shift keying) in return-to-zero (RZ) or non-return-to-zero (NRZ) format. In the case of OOK, the transmission rate of an optical signal is 10 Gbps.

An optical signal output from an optical communication device on the transmitting side is propagated by an optical transmission network, which is a wavelength division multiplexing (WDM) channel. The optical transmission network includes an optical wavelength division multiplexer, an optical amplifier, and a wavelength division demultiplexer in its line.

When the optical amplifier amplifies an optical signal, the S/N ratio of the optical signal deteriorates. Furthermore, in optical transmission over a long distance, wavelength dispersion occurs because of nonlinear characteristics of fiber cables, resulting in waveform distortion. The waveform distortion of the optical signal caused by the wavelength dispersion increases approximately in proportion to the square of the transmission rate.

In recent years, along with large transmission capacity and high-speed optical communications asked for such an optical transmission system, a system for reducing the influence of the wavelength dispersion needs to be developed. The optical modulation technologies in which the transmission rate of an optical signal is 40 Gbps are developed actively and are commercialized. Specifically, the optical modulation technologies such as a duo binary system, a carrier-suppressed return-to-zero (CSRZ) system, a differential phase shift keying (DPSK) system, a binary phase shift keying (BPSK) system, and a differential quadrature phase shift keying (DQPSK) system are used.

As described above, because the waveform distortion of an optical signal caused by the wavelength dispersion increases in proportion to the square of the transmission rate of the optical signal, compensation of the wavelength dispersion becomes more important as the transmission rate of the optical signal is increased. The compensation of the wavelength dispersion in the optical network, which is the WDM channel, includes a method for performing dispersion compensation on each wavelength and a method for performing dispersion compensation on all wavelengths collectively.

The method for performing dispersion compensation on each wavelength requires higher costs than the method for performing dispersion compensation on all wavelengths collectively. By contrast, in the collective dispersion compensation method, wavelength dispersion slopes indicating a slope of dispersion at the zero point of the wavelength are different depending on transmission lines of the optical transmission network. As a result, transmission line dispersion cannot be dispersed and compensated perfectly for all of the wavelengths.

Therefore, in recent years, in the optical communication system whose transmission rate is 40 Gbps, using a variable dispersion compensator for each channel in a direct detection method, such as DPSK and DQPSK, to compensate wavelength dispersion of an optical signal has become the mainstream.

For example, International Publication Pamphlet No. WO 1999/048231 discloses a conventional technology in which wavelength dispersion caused by a transmission line of an optical transmission network is perturbed, errors generated when the former and the latter phases are perturbed are counted and compared, and the center of the perturbation is updated in the direction with fewer errors to compensate the dispersion.

Furthermore, Japanese Laid-open Patent Publication No. 2005-286382 discloses another conventional technology in which dispersion compensation is performed without perturbing wavelength dispersion in a variable dispersion compensator by using characteristics of an optical signal in that the symbol error number or the symbol error rate of each symbol changes at a certain fixed discrimination point depending on a direction of positive dispersion or negative dispersion in residual dispersion caused by temperature change or other factors.

However, in one of the conventional technologies described above, in order to perturb the wavelength dispersion, distortion needs to be generated intentionally in the received demodulated waveform itself. As a result, in addition to deterioration in the Q value, for example, the quality of an extracted clock deteriorates. Furthermore, unexpected malfunction may be induced. For example, the perturbation induces an increase in intersymbol interference, and frequency components included in a band of transmission characteristics of a clock extractor among the frequency components of the distorted waveform are transmitted without any change, thereby increasing jitter of the clock.

Furthermore, in the other of the conventional technologies described above, even if the residual dispersion occurs, when the symbol error numbers of the symbols of the optical signal at the certain fixed discrimination point are approximately equal to each other, it is difficult to detect the residual dispersion from symbol error information of the symbols.

SUMMARY

According to an aspect of an embodiment of the invention, an optical communication device includes a variable dispersion compensator, a photoelectric converter, and a processor. The variable dispersion compensator compensates an amount of wavelength dispersion of an optical signal received from an optical transmission line. The photoelectric converter converts the compensated optical signal into an electrical signal. The processor is operative to extract a frequency of the converted electrical signal, and to discriminate bit information of the electrical signal based on the frequency extracted using a decision phase and a decision threshold. The processor is operative to detect bit error information that is information related to an error of the discriminated bit information, and to control the amount of wavelength dispersion based on the detected bit error information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a flowchart of a dispersion compensation process according to the first embodiment;

FIG. 13 is a flowchart of a dispersion compensation process according to the third embodiment.

DESCRIPTION OF EMBODIMENTS

Outline of the Disclosed Technology

Preferred embodiments will be explained with reference to accompanying drawings. Prior to the explanation of the embodiments, an outline of the disclosed technology will be described. The disclosed technology is a technology in which the numbers of output of bit information "0" and "1" of discrimination errors are made equal by forward error correction (FEC), for example, for an electrical signal into which an optical signal having a periodic symmetrical waveform, such as RZ and NRZ is converted. The bit information is also referred to as a symbol. In the embodiments below, the optical modulation method is explained using RZ-DQPSK as an example. However, it is not limited to RZ-DQPSK, and may be a modulation method, such as RZ-mPSK, RZ-mQAM, RZ-mQPSK, RZ-DmPSK (m represents a positive integer or the like in each case), and RZ-OOK.

Figure 1A:
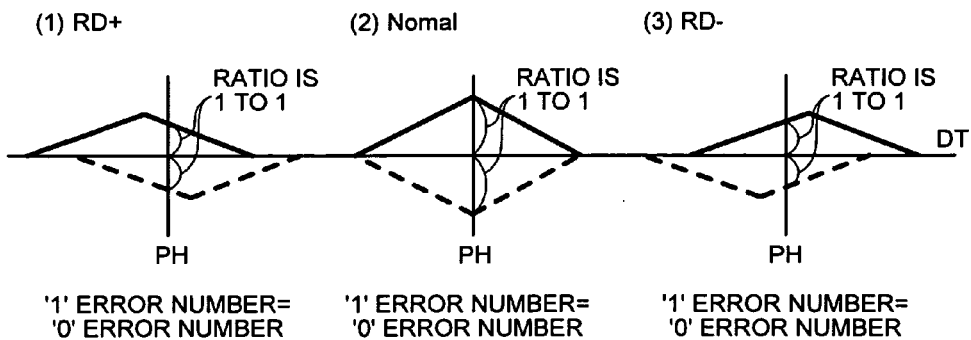
FIG. 1A is a view (first view) for explaining an outline of an embodiment.
Figure 1B:
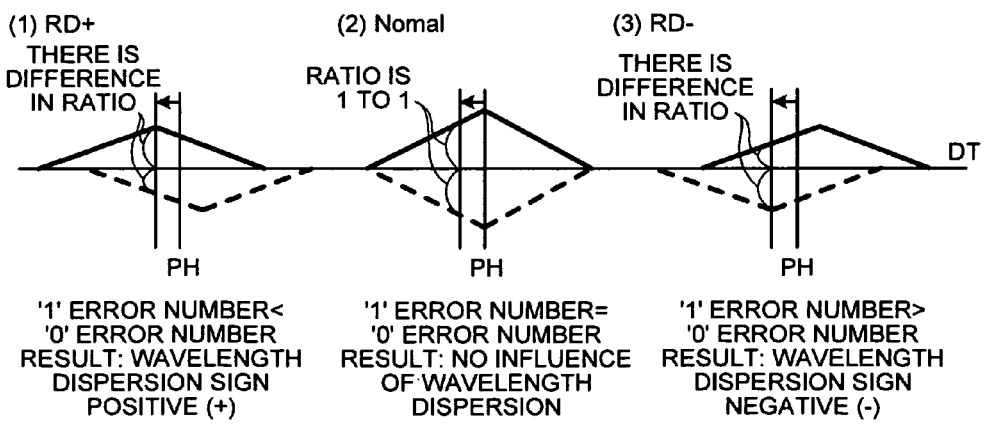
FIG. 1B is another view (second view) for explaining the outline of the embodiment.

FIG. 1A illustrates a state where the numbers of output of bit information "0" and "1" of discrimination errors are equal to each other in a signal of DQPSK obtained by interposing two optical signals having the same waveform with their periods shifted with respect to each other by one half. In FIG. 1A and FIG. 1B, the vertical axis represents decision phase (demux phase)s (PH), and the horizontal axis represents a decision threshold DT (DT, that is, a threshold of voltage values) for discriminating bits of "0" and "1".

In FIG. 1A, "(1) residual dispersion (RD)+" represents a waveform of a received signal in positive dispersion. In FIG. 1A, "(1) RD+" indicates a state (positive dispersion) where a waveform below DT is delayed in the vicinity of a certain decision phase (demux phase) PH, "(2) Normal" indicates a state where no wavelength dispersion occurs in the vicinity of the certain decision phase (demux phase) PH, and "(3) RD−" indicates a state (negative dispersion) where a waveform above DT is delayed in the vicinity of the certain decision phase (demux phase) PH. Because the PH is optimized in each case, the number of "0" recognized as "1" erroneously (hereinafter, referred to as a "0" error number), and the number of "1" recognized as "0" erroneously (hereinafter, referred to as a "1" error number) are equal to each other.

FIG. 1B illustrates a situation in which the decision phase (demux phase) PH in a discrimination unit that discriminates the bit information illustrated in FIG. 1A is changed from the optimized state. Based on the ratio between the "0" error number and the "1" error number in the phase thus changed, a sign of wavelength dispersion is obtained. As illustrated in FIG. 1B, if the decision phase (demux phase) PH is advanced in "(1) RD+", bits that exceed DT to be recognized as "1" increase, whereby the "0" error number increases. Therefore, a magnitude relationship of the "1" error number<the "0"

error number is satisfied, and thus the wavelength dispersion sign is determined to be "positive (+)".

Furthermore, as illustrated in FIG. 1B, if the decision phase (demux phase) PH is advanced in "(3) RD−", bits that fall below DT to be recognized as "0" increase, whereby the "1" error number increases. Therefore, a magnitude relationship of the "1" error number>the "0" error number is satisfied, and thus the wavelength dispersion sign is determined to be "negative (−)".

In "(2) Normal" of FIG. 1B, even if the decision phase (demux phase) PH is advanced, the "1" error number=the "0" error number is satisfied in the same manner as in "(2) Normal" of FIG. 1A. Therefore, it is determined that "no influence of the wavelength dispersion". Based on these wavelength dispersion signs, a control direction of a variable dispersion compensator is determined, thereby making it possible to perform optimization control of the wavelength dispersion.

Figure 2:
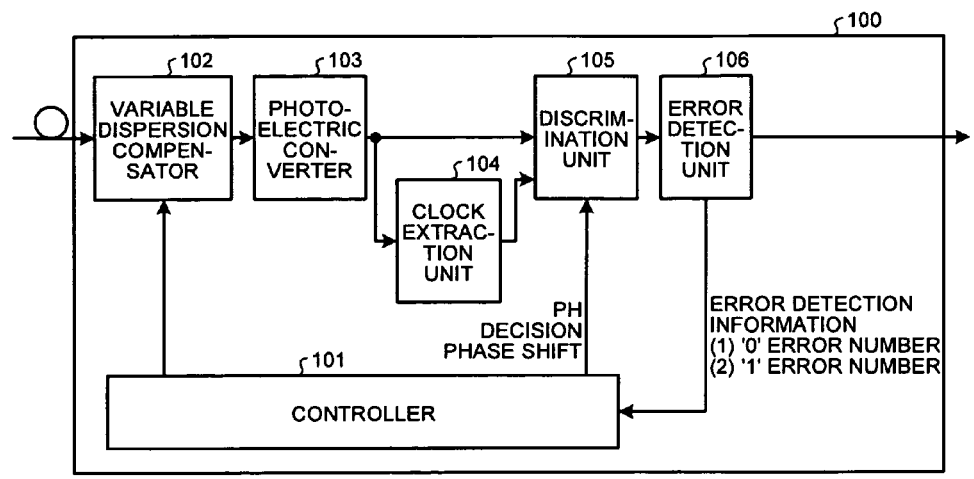
FIG. 2 is a functional block diagram of a basic configuration of an optical communication device according to the embodiment.

FIG. 2 is a functional block diagram of a basic configuration of an optical communication device 100 according to the disclosed technology. The optical communication device 100 according to the disclosed technology includes a variable dispersion compensator 102, a photoelectric converter 103, a clock extraction unit 104, a discrimination unit 105, an error detection unit 106, and a controller 101. In the optical communication device 100, components related to dispersion compensation of a received optical signal alone will be explained, and the illustration and the description of other components will be omitted. The same is true for the embodiments below.

The variable dispersion compensator 102 performs dispersion compensation on an optical signal received from an optical transmission line, and controls at least a delayed phase of the optical signal. The photoelectric converter 103 performs photoelectric conversion for converting the optical signal whose wavelength dispersion is compensated by the variable dispersion compensator 102 into an electrical signal. The clock extraction unit 104 extracts the frequency of the electrical signal from the electrical signal converted by the photoelectric converter 103, and controls phase delay (or phase advance) of the clock.

The discrimination unit 105 receives the electrical signal thus converted photoelectrically and the clock thus extracted, and discriminates bit information indicating that either bit of "0" or "1" the electrical signal is at a certain fixed discrimination point. The certain fixed discrimination point is a point on the waveform of the electrical signal specified by the decision phase (demux phase) PH and the decision threshold DT for discriminating the bit information. The decision phase (demux phase) PH is a phase of the electrical signal for discriminating the bit information. The decision threshold DT is a threshold of voltage of the electrical signal for discriminating the bit information. For example, voltage lower than the decision threshold DT is recognized as "0", and voltage exceeding the decision threshold DT is recognized as "1".

The error detection unit 106 detects a bit error number for each piece of the bit information of "0" or "1" from the electrical signal discriminated by the discrimination unit 105. The bit error number for each piece of the bit information is the "0" error number and the "1" error number. It is to be noted that FEC is typically applied to the error detection. However, it is not limited to FEC, and any code may be applied as far as the code is capable of at least one of error detection and error correction.

The controller 101 receives the bit error number for each piece of the bit information, and controls phase delay (or phase advance) of the clock in the clock extraction unit 104, and controls the amount of dispersion compensation of the optical signal in the variable dispersion compensator 102.

In the dispersion compensation method of the optical signal performed by the optical communication device 100, the phase of the clock received by the discrimination unit 105 is shifted to the advance side or the delay side from a certain state. The variable dispersion compensator 102 performs the dispersion compensation using the fact that an increase or a decrease in the "0" error number and the "1" error number changes depending on the direction and the shift amount (hereinafter, referred to as phase information) of the phase of the clock shifted to the advance side or the delay side by the controller 101, which positive dispersion or negative dispersion the state of the residual dispersion is, and the polarity of positive or negative of the residual dispersion and the dispersion amount thereof.

The controller 101 determines which positive dispersion or negative dispersion the state of the residual dispersion is from the phase information of the clock thus shifted, and the bit error number for each piece of the bit information without perturbation of variable dispersion compensation.

For example, in a state where waveform distortion occurs in the electrical signal after photoelectric conversion because of the residual dispersion, the bit error number for each piece of the bit information in a certain decision phase (demux phase) PH is detected in advance, and the phase of the clock is shifted to the advance side or the delay side from the certain decision phase (demux phase) PH. As a result, the bit error number for each piece of the bit information is different from the detected value of the bit error number for each piece of the bit information in the certain decision phase (demux phase) PH. Based on the change in the bit error number for each piece of the bit information depending on the clock shift direction before and after the clock shift, the control direction of the dispersion amount of the variable dispersion compensator 102 is determined.

The S/N ratio of the electrical signal converted by the photoelectric converter 103 changes depending on quality deterioration immediately after the light reception. An increase or a decrease in the bit error number for each piece of the bit information can be changed by shifting the phase of the clock or controlling the S/N ratio of the electrical signal. Therefore, monitoring sensitivity for the dispersion compensation can be controlled.

[a] First Embodiment

A first embodiment according to the disclosed technology will be explained below with reference to FIG. 3 to FIG. 8. In the first embodiment, in order to compensate wavelength dispersion in a transmission line, the decision phase (demux phase) PH is shifted, and a "0" error correction number and a "1" error correction number, which are error correction information by FEC, are increased or decreased, thereby determining the phase control direction of the variable dispersion compensator 102 obtained by the error correction information. In the first embodiment, the error detection unit 106 is replaced by an error correction unit 106a. In the case, error detection information is FEC error correction information, the "0" error number is the "0" error correction number, and the "1" error number is the "1" error correction number. The FEC error correction information is information of the number of bit information "1" corrected as "0" by FEC (hereinafter, referred to as the "0" error correction number), and the number of bit information "0" corrected as "1" (hereinafter, referred to as the "1" error correction number).

Figure 3:
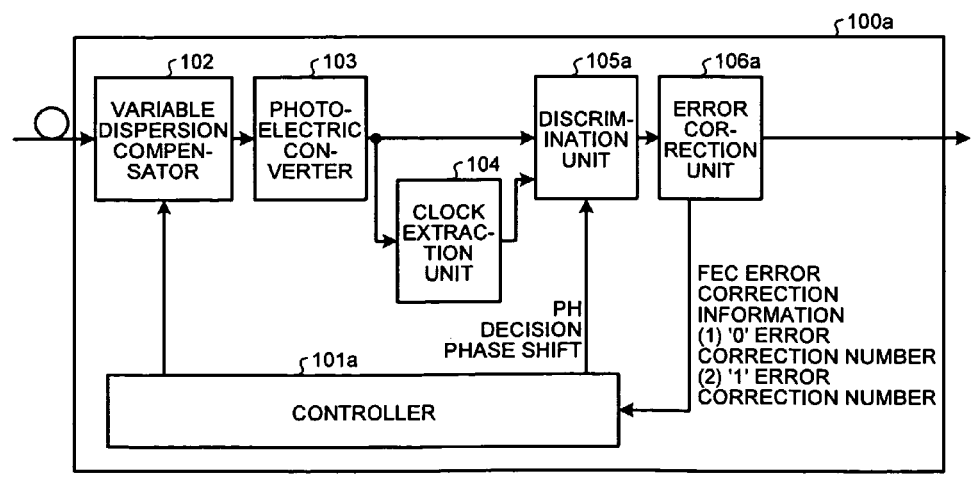
FIG. 3 is a functional block diagram of a configuration of an optical communication device according to a first embodiment.

FIG. 3 is a functional block diagram of a configuration of an optical communication device according to the first embodiment. An optical communication device 100a according to the first embodiment includes the variable dispersion compensator 102, the photoelectric converter 103, the clock extraction unit 104, a discrimination unit 105a, the error correction unit 106a, and a controller 101a.

The variable dispersion compensator 102, the photoelectric converter 103, and the clock extraction unit 104 are configured in the same manner as in the functional units described in the outline of the disclosed technology, and perform the same processing as that of the functional units. In the optical communication device 100a according to the first embodiment, compared with the optical communication device 100, the controller 101 is replaced by the controller 101a, the discrimination unit 105 is replaced by the discrimination unit 105a, and the error detection unit 106 is replaced by the error correction unit 106a. The error correction unit 106a monitors delay of the decision phase (demux phase) PH in the discrimination unit 105a with the error correction information by FEC. Based on the information thus monitored, the controller 101a shifts the decision phase (demux phase) PH in the discrimination unit 105a, and controls the control direction and the compensation amount of dispersion compensation by the variable dispersion compensator 102.

Figure 4A:
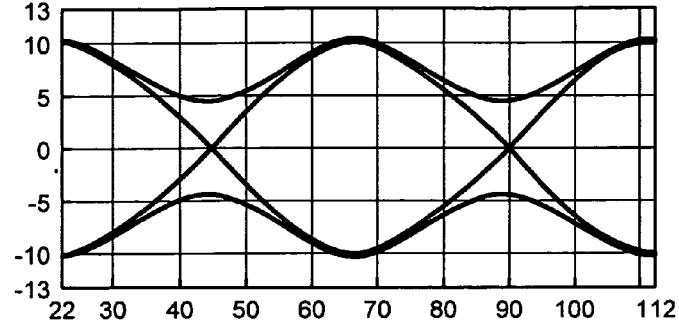
FIG. 4A is a view (first view) illustrating an input waveform to a discrimination unit according to the first embodiment.
Figure 4B:
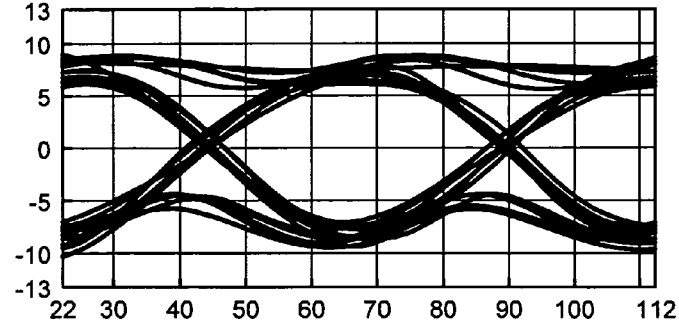
FIG. 4B is another view (second view) illustrating an input waveform to the discrimination unit according to the first embodiment.
Figure 4C:
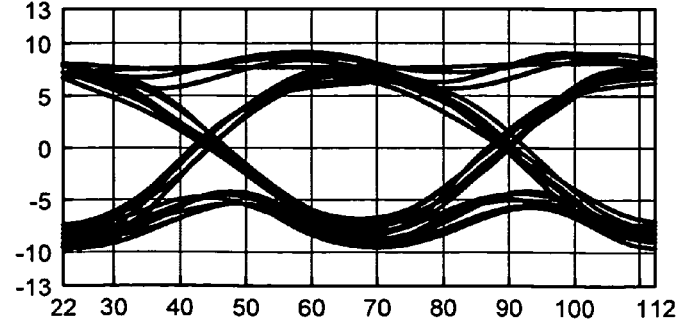
FIG. 4C is still another view (third view) illustrating an input waveform to the discrimination unit according to the first embodiment.

The method for facilitating the determination of the control direction of the variable dispersion compensator 102 will now be described. FIG. 4A to FIG. 4C illustrate simulation waveforms of the electrical signal received by the discrimination unit 105a when the wavelength dispersion in the modulation method for the optical signal by RZ-DQPSK is caused to occur. By using the input waveforms to the discrimination unit 105a when the wavelength dispersion is caused to occur, the method for determining the control direction of the dispersion compensation of the variable dispersion compensator 102 using distorted states of the simulation waveforms will be explained by a relationship between the wavelength dispersion state and the error correction information by FEC.

FIG. 4A illustrates the input waveform of the electrical signal to the discrimination unit 105a when there is no wavelength dispersion. FIG. 4B illustrates the input waveform of the electrical signal to the discrimination unit 105a when the wavelength dispersion is −120 ps/nm (phase delay). FIG. 4C illustrates the input waveform of the electrical signal to the discrimination unit 105a when the wavelength dispersion is +120 ps/nm (phase advance).

Figure 5A:
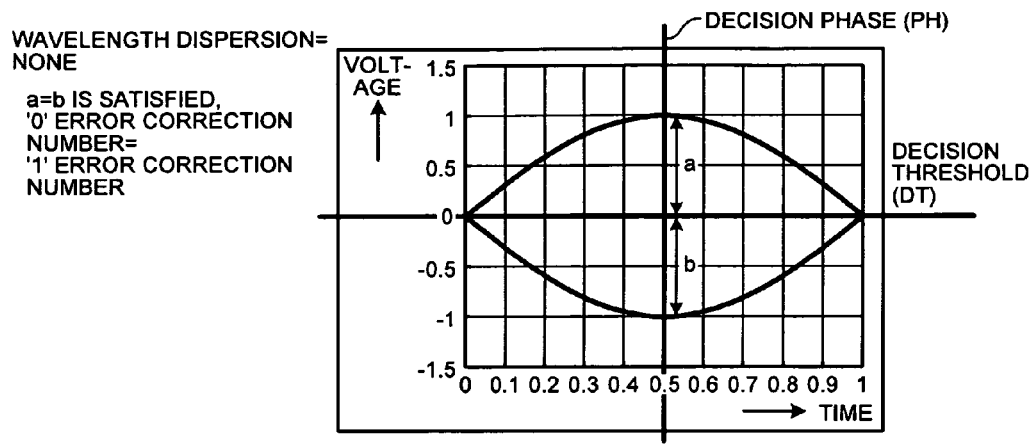
FIG. 5A is a view (first view) illustrating a relationship of the error correction number in a state where a decision phase (demux phase) and a decision threshold are optimized according to the first embodiment.
Figure 5B:
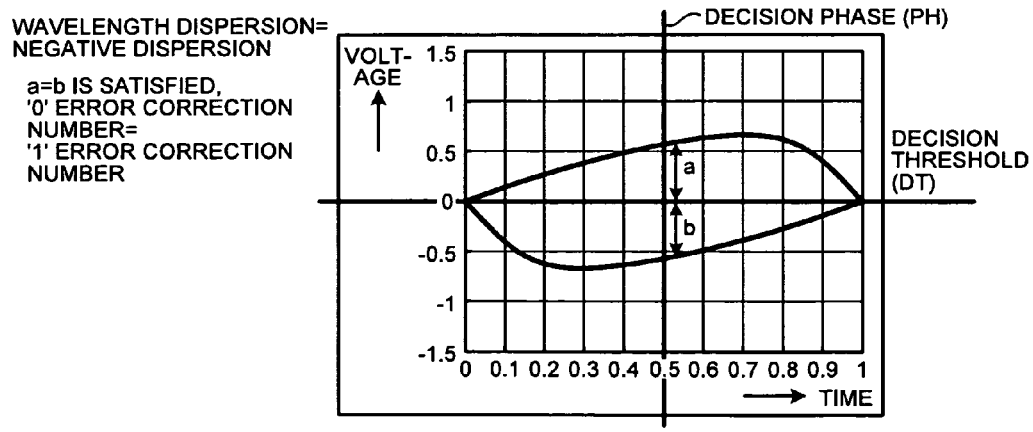
FIG. 5B is another view (second view) illustrating a relationship of the error correction number in the state where the decision phase (demux phase) and the decision threshold are optimized according to the first embodiment.
Figure 5C:
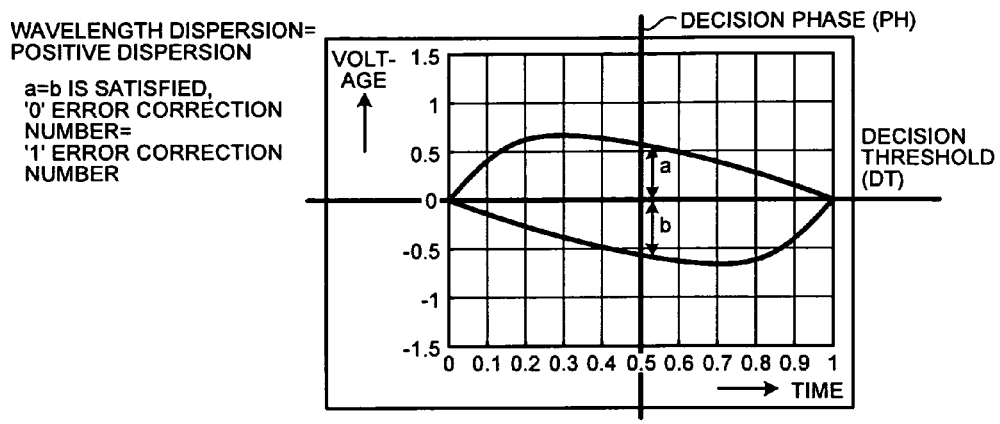
FIG. 5C is still another view (third view) illustrating a relationship of the error correction number in the state where the decision phase (demux phase) and the decision threshold are optimized according to the first embodiment.

FIG. 5A, FIG. 5B, and FIG. 5C are views obtained by schematizing the input waveforms in FIG. 4A, FIG. 4B, and FIG. 4C, respectively. As illustrated in FIG. 5A to FIG. 5C, when the decision phase (demux phase) PH and the decision threshold DT in the discrimination unit 105a are optimized, the values of "a" and "b" in FIG. 4A to FIG. 4C satisfy a=b regardless of the wavelength dispersion. As a result, there is no difference between the "0" error correction number and the "1" error correction number. "a" is an absolute value of a voltage value of an electrical signal waveform exceeding a certain decision threshold DT in the certain decision threshold DT and a certain decision phase (demux phase) PH. "b" is an absolute value of a voltage value of an electrical signal waveform lower than the certain decision threshold DT in the certain decision threshold DT and the certain decision phase (demux phase) PH.

Figure 6A:
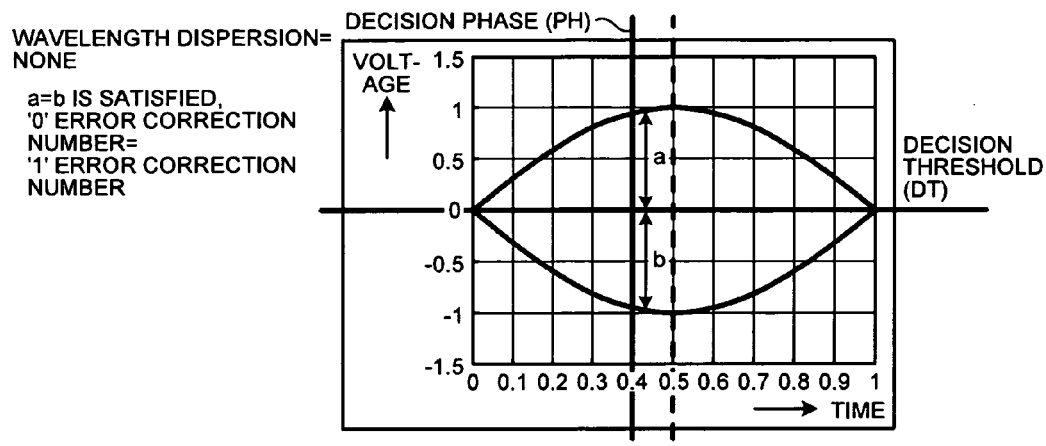
FIG. 6A is a view (first view) illustrating a relationship of the error correction number in a state where the decision phase (demux phase) is shifted to an advance side from the optimized state according to the first embodiment.
Figure 6B:
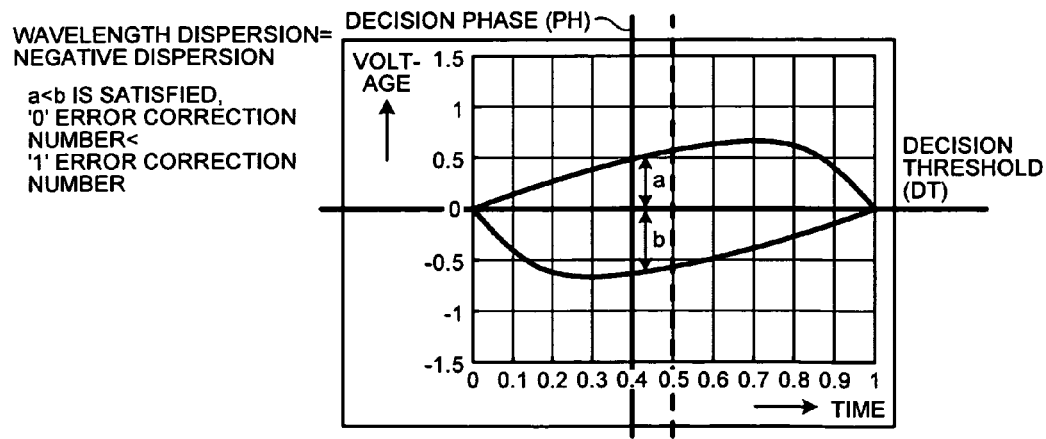
FIG. 6B is another view (second view) illustrating a relationship of the error correction number in the state where the decision phase (demux phase) is shifted to the advance side from the optimized state according to the first embodiment.
Figure 6C:
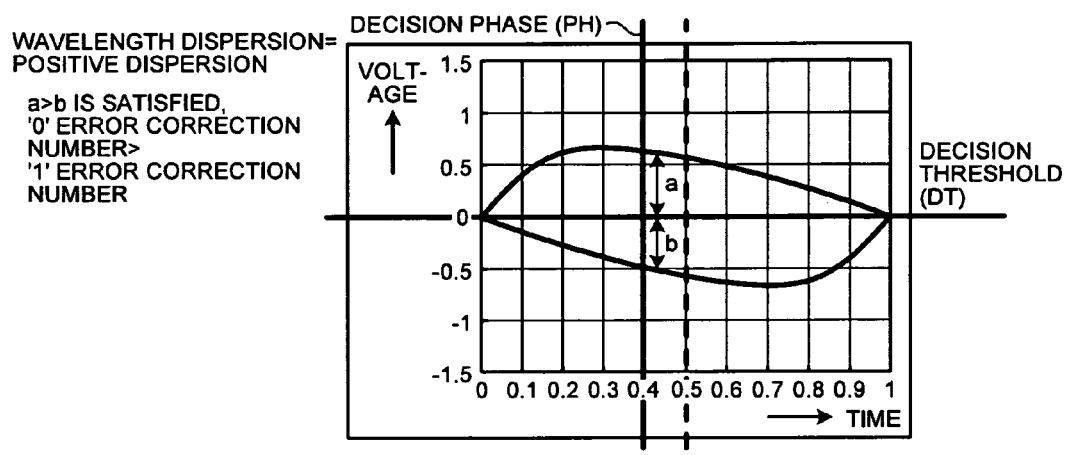
FIG. 6C is still another view (third view) illustrating a relationship of the error correction number in the state where the decision phase (demux phase) is shifted to the advance side from the optimized state according to the first embodiment.

FIG. 6A, FIG. 6B, and FIG. 6C each illustrate the case where the decision phase (demux phase) PH in the input waveforms of FIG. 5A, FIG. 5B, and FIG. 5C is shifted in the discrimination unit 105a, respectively. If the decision phase (demux phase) PH in the discrimination unit 105a is shifted to the phase advance side, when "there is no wavelength dispersion" (in the case of FIG. 6A), a=b is satisfied, whereby the "0" error correction number=the "1" error correction number is satisfied. When "the wavelength dispersion is negative" (in the case of FIG. 6B), a<b is satisfied, whereby the "0" error correction number<the "1" error correction number is satisfied. When "the wavelength dispersion is positive" (in the case of FIG. 6C), a>b is satisfied, whereby the "0" error correction number>the "1" error correction number is satisfied.

If the states illustrated in FIG. 5A to FIG. 5C are the states where the distortion caused by the residual dispersion is the minimum, for example, because a=b is satisfied as described above, it is difficult to determine the control direction of the variable dispersion compensator 102 based on information of a bit information error number obtained by performing error correction on each piece of the bit information. However, if the decision phase (demux phase) PH of the input waveform is shifted in the discrimination unit 105a, the distortion of the waveform depending on the direction of the residual dispersion can be detected. This facilitates the determination of the direction in which the variable dispersion compensator 102 is to be controlled to perform the dispersion compensation.

FIG. 6A, FIG. 6B, and FIG. 6C illustrate the case where the decision phase (demux phase) PH in the discrimination unit 105a is shifted to the phase advance side. However, even if the decision phase (demux phase) PH is shifted to the phase delay side, the distortion of the waveform depending on the direction of the residual dispersion can be detected, thereby facilitating the determination of the direction in which the variable dispersion compensator 102 is to be controlled to perform the dispersion compensation.

Figure 7A:
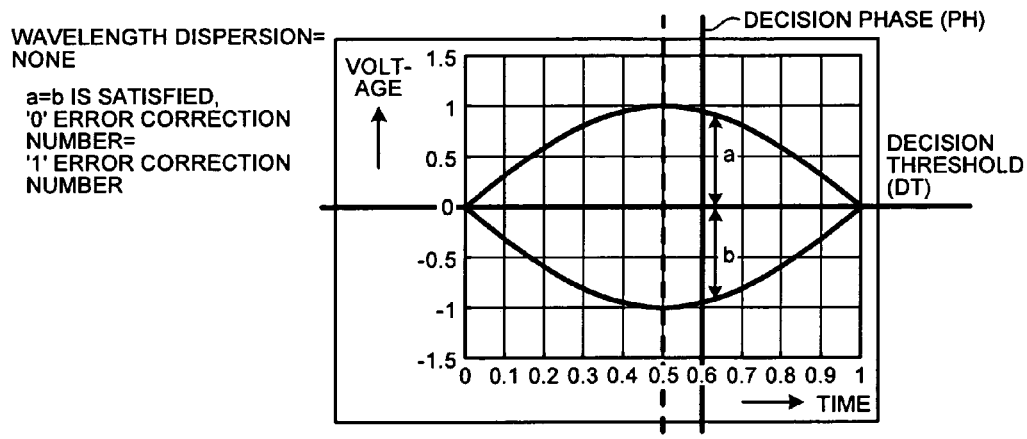
FIG. 7A is a view (first view) illustrating a relationship of the error correction number in a state where the decision phase (demux phase) is shifted to a delay side from the optimized state according to the first embodiment.
Figure 7B:
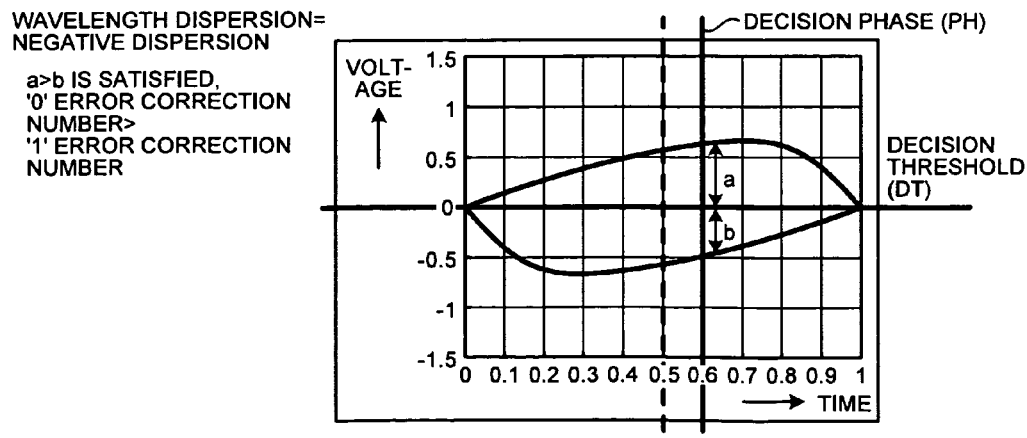
FIG. 7B is another view (second view) illustrating a relationship of the error correction number in the state where the decision phase (demux phase) is shifted to the delay side from the optimized state according to the first embodiment.
Figure 7C:
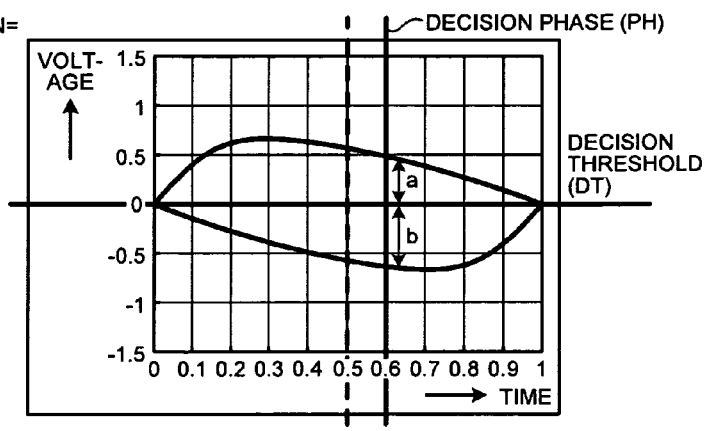
FIG. 7C is still another view (third view) illustrating a relationship of the error correction number in the state where the decision phase (demux phase) is shifted to the delay side from the optimized state according to the first embodiment.

FIG. 7A, FIG. 7B, and FIG. 7C correspond to FIG. 6A, FIG. 6B, and FIG. 6C, respectively, and illustrate the case where the decision phase (demux phase) PH is shifted not to the phase advance side but to the phase delay side. If the decision phase (demux phase) PH in the discrimination unit 105a is shifted to the phase delay side, when "there is no wavelength dispersion" (in the case of FIG. 7A), a=b is satisfied, whereby the "0" error correction number=the "1" error correction number is satisfied. When "the wavelength dispersion is negative" (in the case of FIG. 7B), a>b is satisfied, whereby the "0" error correction number>the "1" error correction number is satisfied. When "the wavelength dispersion is positive" (in the case of FIG. 7C), a<b is satisfied, whereby the "0" error correction number<the "1" error correction number is satisfied.

FIG. 8 is a flowchart of a dispersion compensation process according to the first embodiment. At Step S101, the controller 101a shifts the decision phase (demux phase) PH in the discrimination unit 105a to the phase advance side (or the phase delay side). At Step S102, the controller 101a acquires the error correction information by FEC from the error correction unit 106a. At Step S103, the controller 101a compares the "0" error correction number and the "1" error correction number acquired at Step S102.

At Step S104, the controller 101a determines the control direction of the variable dispersion compensator 102 as follows: in the case where the decision phase (demux phase) PH is shifted to the phase advance side in the discrimination unit 105a, when the "0" error correction number=the "1" error correction number is satisfied, the controller 101a determines not to perform any control on the variable dispersion compensator 102; when the "0" error correction number<the "1" error correction number is satisfied, the controller 101a determines the control direction of the variable dispersion compensator 102 to be positive; and when the "0" error correction number>the "1" error correction number is satisfied, the controller 101a determines the control direction of the variable dispersion compensator 102 to be negative.

If the decision phase (demux phase) PH is shifted to the phase delay side in the discrimination unit 105a, the controller 101a determines the control direction of the variable dispersion compensator 102 as follows: when the "0" error correction number=the "1" error correction number is satisfied, the controller 101a determines not to perform any control on the variable dispersion compensator 102; when the "0" error correction number>the "1" error correction number is satisfied, the controller 101a determines the control direction of the variable dispersion compensator 102 to be positive; and when the "0" error correction number<the "1" error correction number is satisfied, the controller 101a determines the control direction of the variable dispersion compensator 102 to be negative. At Step S105, the controller 101a performs control of the variable dispersion compensator 102 based on the determination result at Step S104. Instead of the "0" error correction number and the "1" error correction number, the "0" error number and the "1" error number in the error detection unit 106 may be used.

Furthermore, the control direction of the variable dispersion compensator 102 may be determined based on an error correction rate instead of the "0" error correction number and the "1" error correction number. In this case, at Step S103, the controller 101a performs the following calculation based on the error correction information thus acquired. The controller 101a calculates "Error Correction Rate 11="0" Error Correction Number/("0" Error Correction Number+"1" Error Correction Number)" or "Error Correction Rate 12="1" Error Correction Number/("0" Error Correction Number+"1" Error Correction Number)". It is obvious that Error Correction Rate 11+Error Correction Rate 12=1 is satisfied.

At Step S104, based on the error correction rate 11 or the error correction rate 12 calculated as described above, the controller 101a determines the control direction of the variable dispersion compensator 102. In this case, the controller 101a can determine the control direction of the variable dispersion compensator 102 by the error correction rate 11 (or the error correction rate 12) alone. Specifically, when the error correction rate 11 (or the error correction rate 12)=0.5 is satisfied, the controller 101a determines not to perform any control on the variable dispersion compensator 102. When the error correction rate 11 (or the error correction rate 12)<0.5 is satisfied, the controller 101a determines the control direction of the variable dispersion compensator 102 to be positive (or negative). When the error correction rate 11 (or the error correction rate 12)>0.5 is satisfied, the controller 101a determines the control direction of the variable dispersion compensator 102 to be negative (or positive).

If the decision phase (demux phase) PH is shifted to the phase delay side in the discrimination unit 105a, the controller 101a determines the control direction of the variable dispersion compensator 102 as follows: when the error correction rate 11 (or the error correction rate 12)=0.5 is satisfied, the controller 101a determines not to perform any control on the variable dispersion compensator 102; when the error correction rate 11 (or the error correction rate 12)<0.5 is satisfied, the controller 101a determines the control direction of the variable dispersion compensator 102 to be negative (or positive); and when the error correction rate 11 (or the error correction rate 12)>0.5 is satisfied, the controller 101a determines the control direction of the variable dispersion compensator 102 to be positive (or negative).

The control direction of the variable dispersion compensator 102 can be determined using the magnitude relationship between the error correction rate 11 and the error correction rate 12. Specifically, if the decision phase (demux phase) PH is shifted to the phase advance side in the discrimination unit 105a, when the error correction rate 11=the error correction rate 12=0.5 is satisfied, the controller 101a determines not to perform any control on the variable dispersion compensator 102. When the error correction rate 11<the error correction rate 12 is satisfied, the controller 101a determines the control direction of the variable dispersion compensator 102 to be positive. When the error correction rate 11>the error correction rate 12 is satisfied, the controller 101a determines the control direction of the variable dispersion compensator 102 to be negative.

If the decision phase (demux phase) PH is shifted to the phase delay side in the discrimination unit 105a, when the error correction rate 11=the error correction rate 12=0.5 is satisfied, the controller 101a determines not to perform any control on the variable dispersion compensator 102. When the error correction rate 11<the error correction rate 12 is satisfied, the controller 101a determines the control direction of the variable dispersion compensator 102 to be negative. When the error correction rate 11>the error correction rate 12 is satisfied, the controller 101a determines the control direction of the variable dispersion compensator 102 to be positive.

If "a" and "b" satisfy a=b±α ($\alpha \neq 0$, e.g., $\alpha < \delta$, and $\delta$ is an arbitrary positive number), the control direction of the variable dispersion compensator 102 is determined by the following process. In this case, the control direction of the variable dispersion compensator 102 is determined by comparing the error correction information for each piece of the bit information before and after the shift of the decision phase (demux phase) PH in the discrimination unit 105a.

If the decision phase (demux phase) PH is shifted to the phase advance side, at Step S103, the controller 101a calculates the error correction rate based on the decision phase (demux phase) PH before the shift, that is, "Error Correction Rate 01="1" Error Correction Number/("0" Error Correction Number+"1" Error Correction Number)" or "Error Correction Rate 02="1" Error Correction Number/("0" Error Correction Number+"1" Error Correction Number)". Furthermore, the controller 101a calculates "Error Correction Rate 11="0" Error Correction Number/("0" Error Correction Number+"1" Error Correction Number)" or "Error Correction Rate 12="1" Error Correction Number/("0" Error Correction Number+"1" Error Correction Number)" based on the decision phase (demux phase) PH after the shift.

When the error correction rate 01=the error correction rate 11 (or the error correction rate 02=the error correction rate 12) is satisfied, the controller 101a determines not to perform any control on the variable dispersion compensator 102. When the error correction rate 01>the error correction rate 11 (or the error correction rate 02<the error correction rate 12) is satisfied, the controller 101a determines the control direction of the variable dispersion compensator 102 to be positive (or negative). When the error correction rate 01<the error correction rate 11 (or the error correction rate 02>the error correction rate 12) is satisfied, the controller 101a determines the control direction of the variable dispersion compensator 102 to be negative.

If the decision phase (demux phase) PH is shifted to the phase delay side, at Step S103, when the error correction rate 01=the error correction rate 11 (or the error correction rate 02=the error correction rate 12) is satisfied, the controller 101a determines not to perform any control on the variable dispersion compensator 102. When the error correction rate 01<the error correction rate 11 (or the error correction rate 02>the error correction rate 12) is satisfied, the controller 101a determines the control direction of the variable dispersion compensator 102 to be positive (or negative). When the error correction rate 01>the error correction rate 11 (or the error correction rate 02<the error correction rate 12) is satisfied, the controller 101a determines the control direction of the variable dispersion compensator 102 to be negative.

Using the error correction information for each piece of the bit information on both sides of the phase advance side and the phase delay side of the decision phase (demux phase) PH can prevent misjudgment due to an increase or a decrease in the error correction amount caused by temporary deterioration of the channel or other factors. As a result, the dispersion compensation in the variable dispersion compensator 102 can be performed accurately. Based on two results of the control direction of the variable dispersion compensator 102 calculated by shifting the decision phase (demux phase) PH to the phase advance side, and of the control direction of the variable dispersion compensator 102 calculated by shifting the decision phase (demux phase) PH to the phase delay side, the proper control direction of the variable dispersion compensator 102 may be determined to perform the dispersion compensation.

Specifically, only when the determination result of the control direction of the variable dispersion compensator 102 obtained by shifting the decision phase (demux phase) PH to the phase advance side, and the determination result of the control direction of the variable dispersion compensator 102 obtained by shifting the decision phase (demux phase) PH to the phase delay side coincide with each other, the coincident control direction is determined to be the control direction of the variable dispersion compensator 102 to control the variable dispersion compensator 102. If the determination results of the control direction do not coincide with each other, the shift of the decision phase (demux phase) PH is performed until they coincide with each other. The fact that "the determination results coincide with each other" is an exemplary indicator by which the dispersion compensation is assumed to reach a significance level.

According to the first embodiment, it is possible to determine the control direction of the variable dispersion compensator 102 simply and accurately, and to perform the dispersion compensation of the received optical signal at high speed.

[b] Second Embodiment

A second embodiment according to the disclosed technology will be explained below with reference to FIG. 9 to FIG. 11. In the first embodiment, the control direction of the variable dispersion compensator 102 is determined by shifting the decision phase (demux phase) PH in the discrimination unit 105a to the phase advance direction or the phase delay direction. By contrast, in the second embodiment, if the determination is difficult to be made because of a fewer error correction number or a fewer error number, for example, shift of the decision threshold DT is added, thereby making it possible to determine the control direction of the variable dispersion compensator 102 more accurately.

Figure 9:
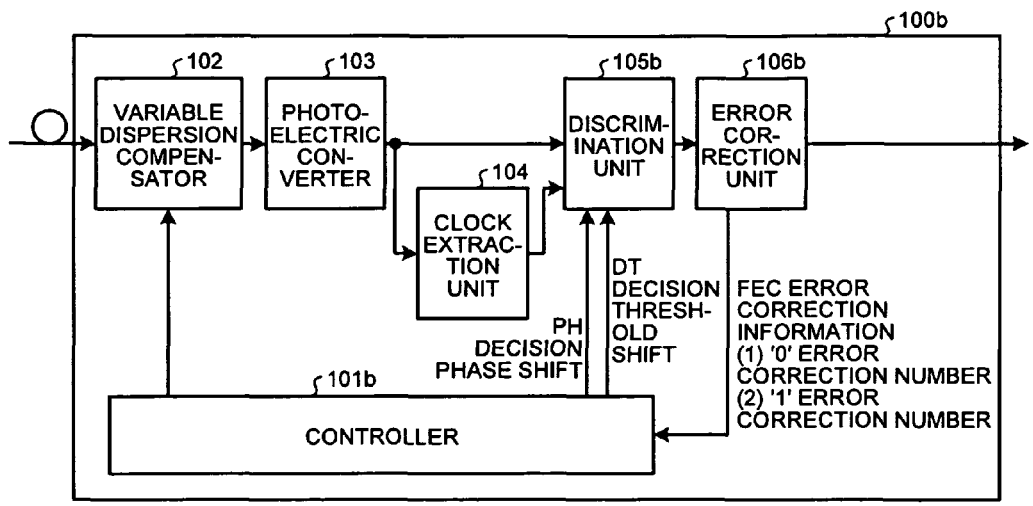
FIG. 9 is a functional block diagram of a configuration of an optical communication device according to a second embodiment.

FIG. 9 is a functional block diagram of a configuration of an optical communication device according to the second embodiment. An optical communication device 100b according to the second embodiment includes the variable dispersion compensator 102, the photoelectric converter 103, the clock extraction unit 104, a discrimination unit 105b, an error correction unit 106b, and a controller 101b.

The variable dispersion compensator 102, the photoelectric converter 103, the clock extraction unit 104, and the error correction unit 106b are configured in the same manner as in the functional units described in the first embodiment, and perform the same processing as that of the functional units. In the optical communication device 100b according to the second embodiment, compared with the optical communication device 100a, the controller 101a is replaced by the controller 101b, and the discrimination unit 105a is replaced by the discrimination unit 105b.

The discrimination unit 105b can shift the decision threshold DT as well as the decision phase (demux phase) PH based on the error correction information by FEC from the error correction unit 106b. The controller 101b controls the shifts of the decision phase (demux phase) PH and the decision threshold DT in the discrimination unit 105b.

Figure 10:
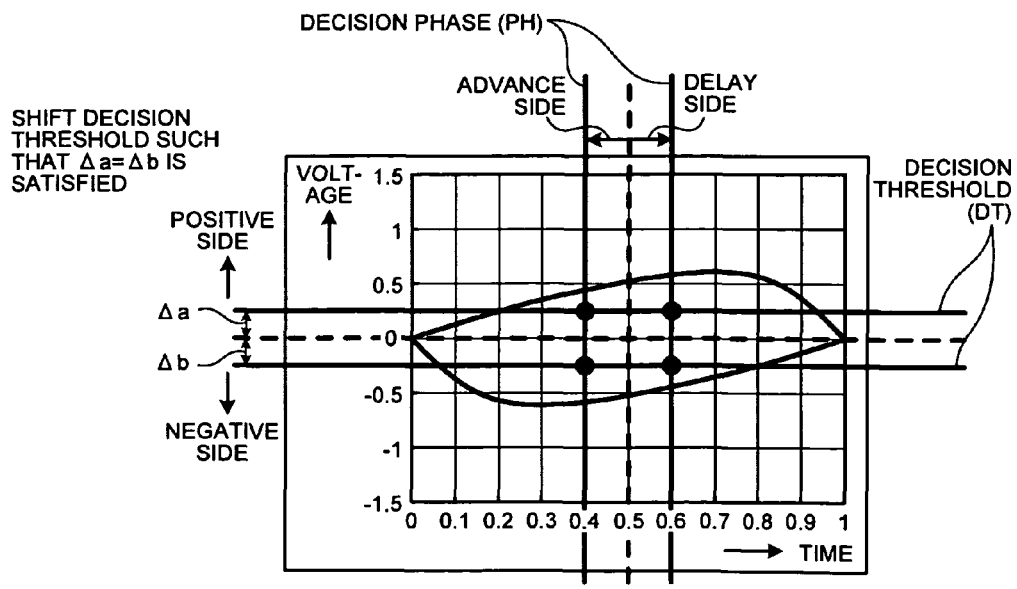
FIG. 10 is a view illustrating an outline of shift of a decision threshold according to the second embodiment.

After shifting the decision phase (demux phase) PH to the phase advance side or the phase delay side, the controller 101b shifts the decision threshold DT by $\Delta a$ to the positive side and by $\Delta b$ to the negative side as illustrated in FIG. 10. The controller 101b then monitors the error correction information for each piece of the bit information, and stores the error correction information in a predetermined storage area. At this time, as illustrated in FIG. 10, the shift amount of the decision threshold DT is controlled such that $\Delta a = \Delta b$ is satisfied. Subsequently, the controller 101b determines the control direction of the variable dispersion compensator 102 based on the error correction information for each piece of the bit information thus stored to perform the dispersion compensation.

In other words, the controller 101b shifts the decision phase (demux phase) PH and the decision threshold DT for discriminating the bit information. The controller 101b determines the direction of the compensation of the wavelength dispersion according to the bit error for each piece of the bit information on four points (that is, four angles of a rectangle illustrated by black dots in FIG. 10) equally distant from the discrimination point of the bit information in the rectangular area (including sides of the rectangle) formed of two decision phase (demux phase)s PH and two decision thresholds DT obtained by shifting the decision threshold upward and downward by the same amount after changing the decision phase (demux phase) in the phase advance direction or the phase delay direction.

For example, based on the calculation results of the error correction rate 11 and the error correction rate 12 in the first embodiment, the control direction of the variable dispersion compensator 102 is determined. The calculation result of the error correction rate 12 of the error correction information for each piece of the bit information when the decision threshold DT is shifted to the positive side is referred to as "RP1", whereas the calculation result of the error correction rate 11 for each piece of the bit information when the decision threshold DT is shifted to the negative side is referred to as "RN1".

The control direction of the variable dispersion compensator 102 is determined as follows: on condition that |*| represents an absolute value of "*", when |RP1−0.5|=|RN1−0.5| is satisfied, the controller 101b determines not to perform any control on the variable dispersion compensator 102; when |RP1−0.5|>|RN1−0.5| is satisfied, the controller 101b determines the control direction of the variable dispersion compensator 102 to be positive; and when |RP1−0.5|<|RN1−0.5| is satisfied, the controller 101b determines the control direction of the variable dispersion compensator 102 to be negative.

Figure 11:
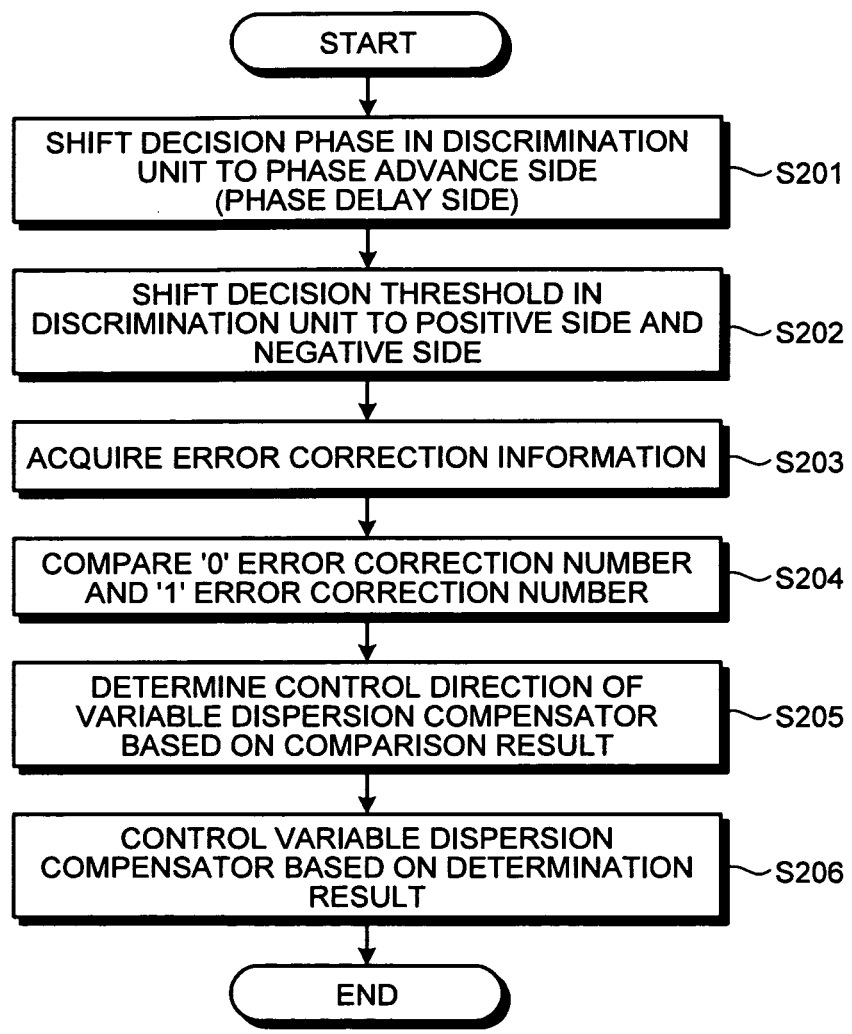
FIG. 11 is a flowchart of a dispersion compensation process according to the second embodiment.

FIG. 11 is a flowchart of a dispersion compensation process according to the second embodiment. At Step S201, the controller 101b shifts the decision phase (demux phase) PH in the discrimination unit 105b to the phase advance side (or the phase delay side). At Step S202, the controller 101b shifts the decision threshold DT in the discrimination unit 105b to both sides of the positive side and the negative side by the same amount. At Step S203, the controller 101b acquires the error correction information by each FEC in which the decision threshold DT is shifted to both sides of the positive side and the negative side by the same amount from the error correction unit 106b.

At Step S204, the controller 101b compares the "0" error correction number and the "1" error correction number acquired at Step S203. At Step S205, the controller 101b determines the control direction of the variable dispersion compensator 102 as follows: when |RP1−0.5|=|RN1−0.5| is satisfied, the controller 101b determines not to perform any control on the variable dispersion compensator; when |RP1−0.5|>|RN1−0.5| is satisfied, the controller 101b determines the control direction of the variable dispersion compensator 102 to be positive; and when |RP1−0.5|<|RN1−0.5| is satisfied, the controller 101b determines the control direction of the variable dispersion compensator 102 to be negative. At Step S206, the controller 101b performs control of the variable dispersion compensator 102 based on the determination result at Step S205.

If the decision threshold DT is shifted when the S/N ratio of the optical transmission line is in bad condition or other states, overflow in the value of the error correction information of the electrical signal into which the optical signal is converted photoelectrically, or loss of synchronization may occur. Therefore, the dispersion compensation may be performed by: shifting the decision threshold DT by an extremely small amount once; determining a shift adjustment amount of the decision threshold DT for determining the control direction of the variable dispersion compensator 102 based on the amount of the error correction information for each piece of the bit information thus shifted; shifting the decision threshold DT by the adjustment amount thus determined; and determining the control direction of the variable dispersion compensator 102. This can reduce the occurrence of overflow in the value of the error correction information of the electrical signal into which the optical signal is converted photoelectrically, and the occurrence of loss of synchronization.

To prevent misjudgment in determination of the control direction of the variable dispersion compensator 102 due to an increase or a decrease in the error correction amount caused by temporary deterioration of the optical transmission line or other factors, based on the result of the control direction of the variable dispersion compensator obtained by shifting the decision phase (demux phase) PH to the phase advance side and the decision threshold DT, and the result of the control direction of the variable dispersion compensator 102 obtained by shifting the decision phase (demux phase) PH to the phase delay side and the decision threshold DT, the shift of the decision phase (demux phase) PH and the shift of the decision threshold DT may be repeated until they coincide with each other. Thus, the proper control direction of the variable dispersion compensator 102 may be determined to perform the dispersion compensation.

According to the second embodiment, the magnitude relationship between the increase rate of the "1" error correction number when the decision threshold DT is shifted to the positive side, and the increase rate of the "0" error correction number when the decision threshold DT is shifted to the negative side is compared, thereby making it possible to determine the control direction of the variable dispersion compensator 102 more accurately.

[c] Third Embodiment

A third embodiment according to the disclosed technology will be explained below with reference to FIG. 12 and FIG. 13. In the first embodiment and the second embodiment, the error correction number for each piece of the bit information is counted during the service launch of the optical communications, thereby making it possible to compensate the dispersion. The third embodiment can perform dispersion compensation even in a state where the error correction number for each piece of the bit information cannot be counted, such as at start-up.

In other words, instead of the error correction number for each piece of the bit information, at least one of a determination result of frame synchronization or desynchronization of a received optical signal and a determination result of error correction capability is used. This makes it possible to detect the S/N ratio of an electrical signal into which the optical signal is converted photoelectrically in the decision phase (demux phase) PH specified by a controller 101c. As a result, dispersion compensation can be performed in the variable dispersion compensator 102. For example, in a state where the quality of the optical signal is not guaranteed, such as at start-up, the error correction number for each piece of the bit information is enormous, and the circuit for counting the error correction number may overflow. The third embodiment can be employed for compensating dispersion in such a state.

Figure 12:
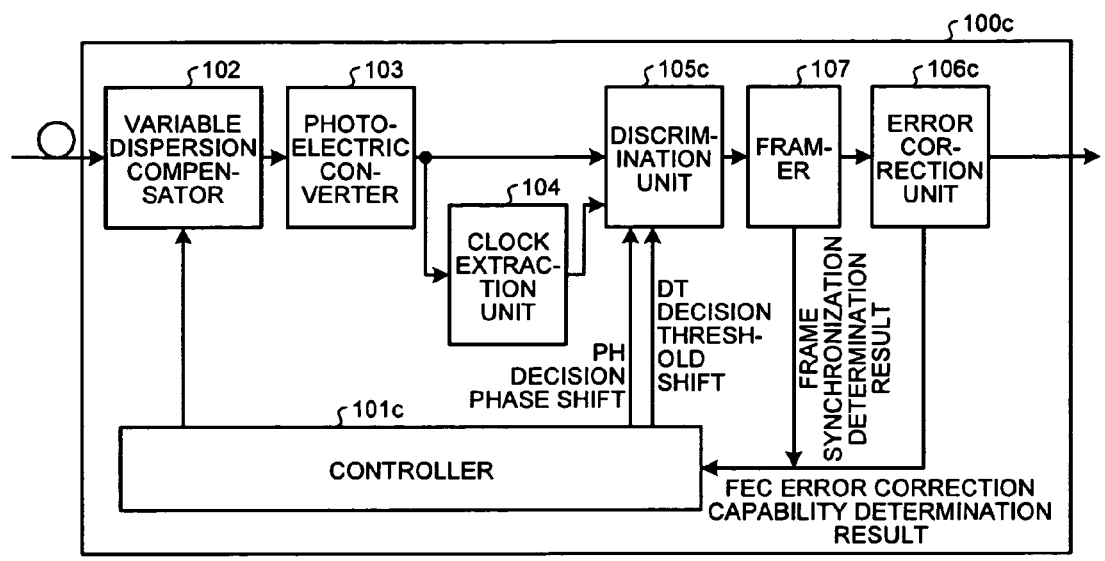
FIG. 12 is a functional block diagram of a configuration of an optical communication device according to a third embodiment.

FIG. 12 is a functional block diagram of a configuration of an optical communication device according to the third embodiment. An optical communication device 100c according to the third embodiment includes the variable dispersion compensator 102, the photoelectric converter 103, the clock extraction unit 104, a discrimination unit 105c, a framer 107, an error correction unit 106c, and the controller 101c.

The variable dispersion compensator 102, the photoelectric converter 103, and the clock extraction unit 104 are configured in the same manner as in the functional units described in the first embodiment and the second embodiment, and perform the same processing as that of the functional units. In the optical communication device 100c according to the third embodiment, compared with the optical communication device 100a and the optical communication device 100b, the controller 101a or the controller 101b is replaced by the controller 101c, and the discrimination unit 105a or the discrimination unit 105b is replaced by the discrimination unit 105c. In addition, the error correction unit 106a or the error correction unit 106b is replaced by the error correction unit 106c, and the framer 107 is arranged between the discrimination unit 105c and the error correction unit 106c.

The framer 107 determines whether an electrical signal converted photoelectrically is in a frame synchronization state, and outputs the determination result to the controller 101c. The error correction unit 106c determines whether FEC error correction can be performed, and outputs the determination result to the controller 101c.

In the third embodiment, the discrimination unit 105c shifts the decision phase (demux phase) PH to the phase advance side, and then shifts the decision threshold DT to the positive side and the negative side. During the shift of the decision threshold, the controller 101c monitors at least one of the frame synchronization and the error correction capability. If the frame synchronization is used, for example, the controller 101c calculates the shift amount of the decision threshold when the electrical signal changes from a synchronization state to a desynchronization state. Subsequently, the controller 101c calculates the shift amounts of the decision threshold corresponding to the shifts of the decision threshold to the positive side and the negative side, respectively. The controller 101c then compares the magnitude relationship therebetween to determine the control direction of the variable dispersion compensator 102.

Specifically, if the decision threshold is shifted to the positive side, the shift amount of the decision threshold when the electrical signal changes from the frame synchronization state to the frame desynchronization state is represented by ΔA. If the decision threshold is shifted to the negative side, the shift amount of the decision threshold when the electrical signal changes from the frame synchronization state to the desynchronization state is represented by ΔB. The control direction of the variable dispersion compensator 102 is determined as follows.

When ΔA=ΔB is satisfied, the controller 101c performs no control on the variable dispersion compensator. When ΔA<ΔB is satisfied, the controller 101c determines the control direction of the variable dispersion compensator 102 to be positive. When ΔA>ΔB is satisfied, the controller 101c determines the control direction of the variable dispersion compensator 102 to be negative. Based on such standards, the control direction of the variable dispersion compensator 102 is determined to perform dispersion compensation.

FIG. 13 is a flowchart of a dispersion compensation process according to the third embodiment. At Step S301, the controller 101c shifts the decision phase (demux phase) PH in the discrimination unit 105c to the phase advance side (or the phase delay side). At Step S302, the controller 101c shifts the decision threshold DT in the discrimination unit 105c to both sides of the positive side and the negative side by the same amount. At Step S303, the controller 101c determines whether to compensate the dispersion by using the frame synchronization. If the controller 101c determines that the wavelength dispersion occurs by using the frame synchronization (YES at Step S303), the process goes to Step S308. If the controller 101c determines that the wavelength dispersion does not occur by using the frame synchronization (NO at Step S303), the process goes to Step S304.

At Step S304, the controller 101c acquires the error correction information by each FEC in which the decision threshold DT is shifted to both sides of the positive side and the negative side by the same amount from the error correction unit 106c. At Step S305, the controller 101c compares the "0" error correction number and the "1" error correction number acquired at Step S304. At Step S306, the controller 101c determines the control direction of the variable dispersion compensator 102 in the same manner as in the first embodiment or the second embodiment. At Step S307, the controller 101c performs control of the variable dispersion compensator 102 based on the determination result at Step S306.

By contrast, at Step S308, the controller 101c monitors the determination result of the frame synchronization from the framer 107, and determines whether the electrical signal is in the frame desynchronization state. If the controller 101c determines that the electrical signal is in the frame desynchronization state (YES at Step S308), the process goes to Step S310. If the controller 101c determines that the electrical signal is not in the frame desynchronization state (NO at Step S308), the process goes to Step S309. At Step S309, the controller 101c shifts the decision threshold DT in the discrimination unit 105c by a different shift amount from that of Step S302. After this processing is completed, the process returns to Step S308.

At Step S310, the controller 101c acquires the shift amount of the decision thresholds ΔA and ΔB when the electrical signal is in the frame desynchronization state. At Step S311, based on the magnitude relationship between ΔA and ΔB, the controller 101c determines the control direction and the control amount of the variable dispersion compensator 102. The controller 101c then performs the control in the control direction and by the control amount thus determined to perform the dispersion compensation of the optical signal. This flowchart is just an example, and the processing at Step S304 may be performed after the processing at Step S311.

When the signal quality is not guaranteed, such as start-up of the optical communication device 100c, the error correction number for each piece of the bit information may be enormous, and the circuit for counting the error correction number may overflow. According to the third embodiment, dispersion compensation can be performed regardless of the overflow state.

The embodiments according to the disclosed technology are explained. However, the disclosed technology is not limited to the embodiments, and may be applied to various different embodiments within the spirit and scope of the technological thought disclosed in claims. The advantageous effects disclosed in the embodiments are not limited thereto. Furthermore, in the embodiments, provided is an optical communication device that includes a discrimination unit having information of the error number for each piece of bit information and at least a variable decision phase (demux phase) function, and a dispersion compensator having a variable dispersion compensator. However, these components may be combined with other known embodiments. For example, control is known in which information of the error number for each piece of bit information is monitored to control a discrimination point. If the device that realizes characteristic functions of the disclosed technology is caused to perform other control in parallel, the processing is facilitated in time division.

The error correction number for each piece of the bit information can be detected from the number of error correction for each piece of the bit information by the error correction unit 106a or the error correction unit 106b. In a transmitting communication device on the corresponding transmitting side, a predetermined frame signal for detecting the error correction number for each piece of the bit information may be generated, and an optical communication device on the receiving side may receive the frame signal to detect the error correction number for each piece of the bit information from the frame signal.

The controller 101a, the controller 101b, or the controller 101c determines the control direction of the variable dispersion compensator 102 after shifting the decision phase (demux phase) PH or the decision threshold DT. Therefore, if the determination is made in a single discrimination unit 105b, the processing needs to be performed in time division. During the processing, in the optical transmission line and the optical communication devices on both of the transmitting and receiving sides, if the S/N ratio of the optical signal deteriorates unexpectedly at a certain instant, the error correction number for each piece of the bit information may change instantaneously. Because the determination is made based on the error correction number in association with the unexpected change, an incorrect determination may be made.

To prevent such a situation from occurring, a result obtained by determining the control direction of the variable dispersion compensator three times or more is used, thereby reducing the probability of incorrect determination. For example, the determination for controlling the variable dispersion compensator may be made odd number of times (e.g., three times), and the variable dispersion compensator 102 may be controlled based on the result of majority decision in the determination of the number of times. The method for increasing the number of times of determination can be simply realized by a combination of the embodiments.

In the processing explained in the embodiments, all or a part of the processing explained as processing performed automatically may be performed manually, or all or a part of the processing explained as processing performed manually may be performed automatically by a known method. In addition, the processing process, the control process, the specific names, and the information including various types of data and parameters described in the embodiments can be changed arbitrarily if not otherwise specified.

The components of the devices are illustrated as functional concepts, and are not necessarily configured physically in the manner illustrated. In other words, specific aspects of distribution and integration of the devices are not limited to the illustrated configuration, and can be configured by distributing or integrating all or a part thereof by arbitrary units functionally or physically depending on various types of loads and usage.

Each optical communication device 100, 100*a*, 100*b*, and 100*c* in above explained embodiments comprises a processor and a memory as hardware components.

With the disclosed technology, even if the symbol error numbers for symbols caused by residual dispersion at a certain fixed discrimination point of an optical signal are approximately equal, wavelength dispersion of the optical signal can be compensated by the variable dispersion compensator 102 in simple processing without perturbing the wavelength dispersion, and an optical communication device can start promptly to perform optical communications.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication device comprising:
a variable dispersion compensator that compensates an amount of wavelength dispersion of an optical signal received from an optical transmission line;
a photoelectric converter that converts the compensated optical signal into an electrical signal; and
a processor that is operative
to extract a frequency of the converted electrical signal,
to discriminate "0" bit information and "1" bit information of the electrical signal based on the frequency extracted using a decision phase and a decision threshold,
to detect bit error information that is information related to a bit error and the number of the bit error of each piece of the discriminated "0" bit information and "1" bit information, and
to control the compensation amount of wavelength dispersion of the optical signal in accordance with a determination result of which positive dispersion or negative dispersion a state of residual dispersion of the optical signal is, based on a comparison result of the detected number of the bit error of the "0" bit information with the detected number of the bit error of the "1" bit information, wherein
the processor is operative to detect bit error information that is information related to the bit error and the number of the bit error of each piece of the discriminated "0" bit information and "1" bit information based on the decision phase in a changed state caused by changing the decision phase in an advance direction or a delay direction.

2. The optical communication device according to claim 1, wherein the processor is operative
to correct the error of the bit information, and
to detect the bit error information based on error correction information that is information related to error correction for each piece of the bit information is corrected.

3. The optical communication device according to claim 2, wherein the processor is operative
to monitor the error correction information during optical communications, and
to control the amount of the wavelength dispersion within a predetermined range of an S/N ratio.

4. The optical communication device according to claim 2, wherein
when optical communications are started, the processor is operative to control the amount of the wavelength dispersion based on a determination result of frame synchronization or desynchronization and a determination result of error correction capability.

5. The optical communication device according to claim 1, wherein the processor is operative
to detect error information for each piece of the bit information from a frame signal corresponding to the optical signal received together with the optical signal from the optical transmission line.

6. The optical communication device according to claim 1, wherein
the information related to the error correction for each piece of the bit information or the error information for each piece of the bit information is an error number for each piece of the bit information.

7. The optical communication device according to claim 1, wherein
the information related to the error correction for each piece of the bit information or the error information for each piece of the bit information is a ratio of an error number of the bit information to all error numbers of the bit information.

8. The optical communication device according to claim 1, wherein the processor is operative
to shift the decision phase (demux phase), and
to detect the bit error information based on a comparison result of a bit error of each piece of the bit information based on the decision phase before and after being shifted.

9. The optical communication device according to claim 8, wherein
when the comparison result of the bit error of each piece of the bit information is identical or similar to each other, the processor is operative to detect the bit error information based on the comparison result of the bit error of each piece of the bit information based on the decision phase before and after being shifted.

10. The optical communication device according to claim 8, wherein the processor is operative
to determine a direction of compensation of the wavelength dispersion in accordance with a change in the decision phase caused by shifting the decision phase in an advance direction or a delay direction to perform dispersion compensation, and determines the direction of the compensation of the wavelength dispersion in accordance with the change in the decision phase caused by shifting the decision phase in the advance direction or the delay direction to continue the dispersion compensation until the dispersion compensation reaches a predetermined compensation level.

11. The optical communication device according to claim 8, wherein the processor is operative
to determine a direction of compensation of the wavelength dispersion in accordance with the bit error for each piece of the bit information based on the decision phase in a changed state caused by changing the decision phase in an advance direction or a delay direction.

12. The optical communication device according to claim 8, wherein the processor is operative
to determine a direction of compensation of the wavelength dispersion in accordance with the bit error for each piece of the bit information based on the decision phase in a state where the decision phase is further shifted in a delay direction or an advance direction after being shifted in the advance direction or the delay direction.

13. The optical communication device according to claim 8, wherein the processor is operative
to determine a direction of compensation of the wavelength dispersion in accordance with the bit error for each piece of the bit information based on the decision phase in a state where the decision phase is further shifted in an advance direction or a delay direction after being shifted in the advance direction or the delay direction.

14. The optical communication device according to claim 1, wherein the processor is operative
to control the amount of the wavelength dispersion based on a result obtained by detecting the bit error information that is information related to the error of the bit information discriminated odd number of times of three or more.

15. A dispersion compensation method performed by an optical communication device, the dispersion compensation method comprising:
compensating an amount of wavelength dispersion of an optical signal received from an optical transmission line;
converting photoelectrically the compensated optical signal into an electrical signal;
extracting a frequency of the converted electrical signal;
discriminating "0" bit information and "1" bit information of the converted electrical signal based on the extracted frequency using a decision phase and a decision threshold;
detecting bit error information that is information related to a bit error and the number of the bit error of each piece of the discriminated "0" bit information and "1" bit information; and
controlling the compensation amount of wavelength dispersion compensation of the optical signal performed at the compensating in accordance with a determination result of which positive dispersion or negative dispersion a state of residual dispersion of the optical signal is, based on a comparison result of the detected number of the bit error of the "0" bit information with the detected number of the bit error of the "1" bit information, wherein
the detecting includes detecting bit error information that is information related to the bit error and the number of the bit error of each piece of the discriminated "0" bit information and "1" bit information based on the decision phase in a changed state caused by changing the decision phase in an advance direction or a delay direction at the controlling.

16. The dispersion compensation method according to claim 15, further comprising:
correcting the error of the bit information, wherein
the detecting includes detecting the bit error information based on error correction information that is information related to error correction for each piece of the bit information in which the bit information discriminated erroneously at the discriminating is corrected at the correcting.

17. The dispersion compensation method according to claim 15, wherein
the detecting includes detecting error information for each piece of the bit information from a frame signal corresponding to the optical signal received together with the optical signal from the optical transmission line.

18. The dispersion compensation method according to claim 17, wherein
when a comparison result of a bit error of each piece of the bit information is identical or similar to each other, the detecting includes detecting the bit error information based on the comparison result of the bit error of each piece of the bit information based on the decision phase before and after being shifted at the controlling.

19. The dispersion compensation method according to claim 15, wherein
the controlling includes shifting the decision phase, and
the detecting includes detecting the bit error information based on a comparison result of a bit error of each piece of the bit information based on the decision phase before and after being shifted at the controlling.

20. An optical communication device comprising:
a processor; and
a memory, wherein the processor configured to execute a process comprising:
compensating an amount of wavelength dispersion of an optical signal received from an optical transmission line;
converting photoelectrically the optical signal into an electrical signal;
extracting a frequency of the converted electrical signal;
discriminating "0" bit information and "1" bit information of the electrical signal based on the extracted frequency using a decision phase and a decision threshold;
detecting bit error information that is information related to a bit error and the number of the bit error of each piece of the discriminated "0" bit information and "1" bit information; and
controlling the compensation amount of wavelength dispersion compensation of the optical signal performed at the compensating in accordance with a determination result of which positive dispersion or negative dispersion a state of residual dispersion of the optical signal is, based on a comparison result of the detected number of the bit error of the "0" bit information with the detected number of the bit error of the "1" bit information, wherein the detecting includes detecting bit error information that is information related to the bit error and the number of the bit error of each piece of the discriminated "0" bit information and "1" bit information based on the decision phase in a changed state caused by changing the decision phase in an advance direction or a delay direction at the controlling.

\* \* \* \* \*